(12) United States Patent
Johnson et al.

(10) Patent No.: US 7,980,574 B2
(45) Date of Patent: Jul. 19, 2011

(54) TORQUE ROD BRACKET ASSEMBLY

(75) Inventors: Kevin Johnson, Fort Wayne, IN (US); Jonathan D. Batdorff, Fort Wayne, IN (US); Qiang Zhang, Columbus, IN (US); James J. Korson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 204 days.

(21) Appl. No.: 12/506,422

(22) Filed: Jul. 21, 2009

(65) Prior Publication Data

US 2011/0018218 A1 Jan. 27, 2011

(51) Int. Cl.
*B60G 3/06* (2006.01)

(52) U.S. Cl. ........... 280/124.107; 280/124.166; 248/200

(58) Field of Classification Search ........... 280/124.107, 280/124.156, 124.104, 124.166, 124.11; 180/349, 352; 248/251, 254, 200
See application file for complete search history.

(56) References Cited

U.S. PATENT DOCUMENTS

| 3,423,099 | A | * | 1/1969 | De Mars | 280/124.107 |
|---|---|---|---|---|---|
| 4,465,298 | A | * | 8/1984 | Raidel, Sr. | 280/124.116 |
| 4,714,269 | A | * | 12/1987 | Raidel | 280/683 |
| 5,112,078 | A | * | 5/1992 | Galazin et al. | 280/124.116 |
| 5,288,100 | A | | 2/1994 | Cherry | |
| 5,333,896 | A | * | 8/1994 | Creighton | 280/124.156 |
| 6,270,282 | B1 | * | 8/2001 | McLaughlin | 403/158 |
| 6,328,322 | B1 | * | 12/2001 | Pierce | 280/124.131 |
| 6,390,485 | B1 | * | 5/2002 | Cadden | 280/124.163 |
| 6,439,588 | B1 | | 8/2002 | Svensson | |
| 6,527,286 | B2 | * | 3/2003 | Keeler et al. | 280/124.135 |
| 6,659,479 | B1 | | 12/2003 | Raidel, II | |
| 6,793,225 | B2 | * | 9/2004 | Svartz et al. | 280/124.107 |
| 7,300,064 | B2 | * | 11/2007 | Johnson et al. | 280/124.106 |
| 7,416,200 | B2 | * | 8/2008 | Hass et al. | 280/124.116 |
| 7,469,913 | B2 | * | 12/2008 | Leden et al. | 280/124.107 |
| 2003/0067133 | A1 | * | 4/2003 | Eveley | 280/124.11 |
| 2004/0188973 | A1 | * | 9/2004 | Molitor | 280/124.166 |
| 2006/0290090 | A1 | * | 12/2006 | Leden et al. | 280/124.135 |
| 2009/0212522 | A1 | * | 8/2009 | Stuart et al. | 280/124.109 |

FOREIGN PATENT DOCUMENTS

JP 10250303 9/1998

OTHER PUBLICATIONS

Screenshot from www.truckcomponentsonline.com, showing the Kenworth Airglide 100 Air Suspension, Jun. 1, 2009.
800 Navistar 40K Parts Manual.

* cited by examiner

*Primary Examiner* — Faye M. Fleming
*Assistant Examiner* — Drew Brown
(74) *Attorney, Agent, or Firm* — Jeffrey P. Calfa; Mark C. Bach

(57) ABSTRACT

There is provided a torque rod bracket assembly for an axle assembly of a motor vehicle. The torque rod bracket assembly has a torque rod mounting bracket engaging plates with a plate connector. The torque rod mounting bracket has a base, a first sidewall, and a second sidewall. A receiver wall located between the first sidewall and the second sidewall has a centrally located recess. Slots are located in the receiver wall between the recess and the sidewalls. Axle mounts mount the torque rod bracket assembly to the axle housing of the axle assembly.

18 Claims, 6 Drawing Sheets

TORQUE ROD BRACKET ASSEMBLY

BACKGROUND

Embodiments disclosed herein relate to a torque rod bracket assembly for an axle.

Torque rods prevent relative lateral movement between an axle and a motor vehicle, such as a truck or tractor frame. An axle end of the torque rod connects to the axle and a frame end of the torque rod connects to the frame. The ends of the torque rod allow the torque rod to pivot with respect to the axle and the frame. Because motor vehicle models vary greatly from one to another, numerous orientations of torque rod length and angle of incline of the torque rod are required to maintain a smooth and safe ride. This requirement also requires numerous orientations for mounting the torque rod to a torque rod bracket and the axle and frame.

SUMMARY

Embodiments disclosed herein relate to a torque rod bracket assembly. One embodiment comprises two plates and a torque rod mounting bracket having a retainer, and a plate connector engaging at least one of the two plates. The retainer has a base having a first face, and an opposite second face. A first sidewall extends outwardly from the base and a second sidewall extends outwardly from the base opposite the first sidewall. A receiver wall is located between the first sidewall and the second sidewall and is substantially perpendicular to the base. A recess is centrally located between the first sidewall and the second sidewall in the receiver wall. Axle mounts are fastened to the two plates and have a body, opposite fore and aft ends, and an opening in the body from the fore end to the aft end.

In another embodiment, a torque rod mounting bracket comprises a base having a first face, and an opposite second face. A first sidewall extends outwardly from the base and a second sidewall extends outwardly from the base opposite the first sidewall. A receiver wall is located between the first sidewall and the second sidewall and is substantially perpendicular to the base. A recess is centrally located between the first sidewall and the second sidewall in the receiver wall. A first slot is located between the recess and the first sidewall and a second slot is located between the recess and the second sidewall. A plate connector projects from the second face of the base.

A further embodiment provides a torque rod bracket assembly for an axle assembly comprising an axle housing having a central portion, a first arm projecting from the central portion, and a second arm opposite the first arm and projecting from the central portion. A first axle mount projects from the central portion of the axle housing. The first axle mount has a first fore end, and an opposite first aft end. A second axle mount projects from the axle housing and is spaced apart from the first axle mount. The second axle mount has a second fore end, and an opposite second aft end. A first plate engages the first fore end and the second fore end. A second plate engages the first aft end and the second aft end. A torque rod mounting bracket has a retainer, and a plate connector engages the second plate.

DETAILED DESCRIPTION

Figure 1:
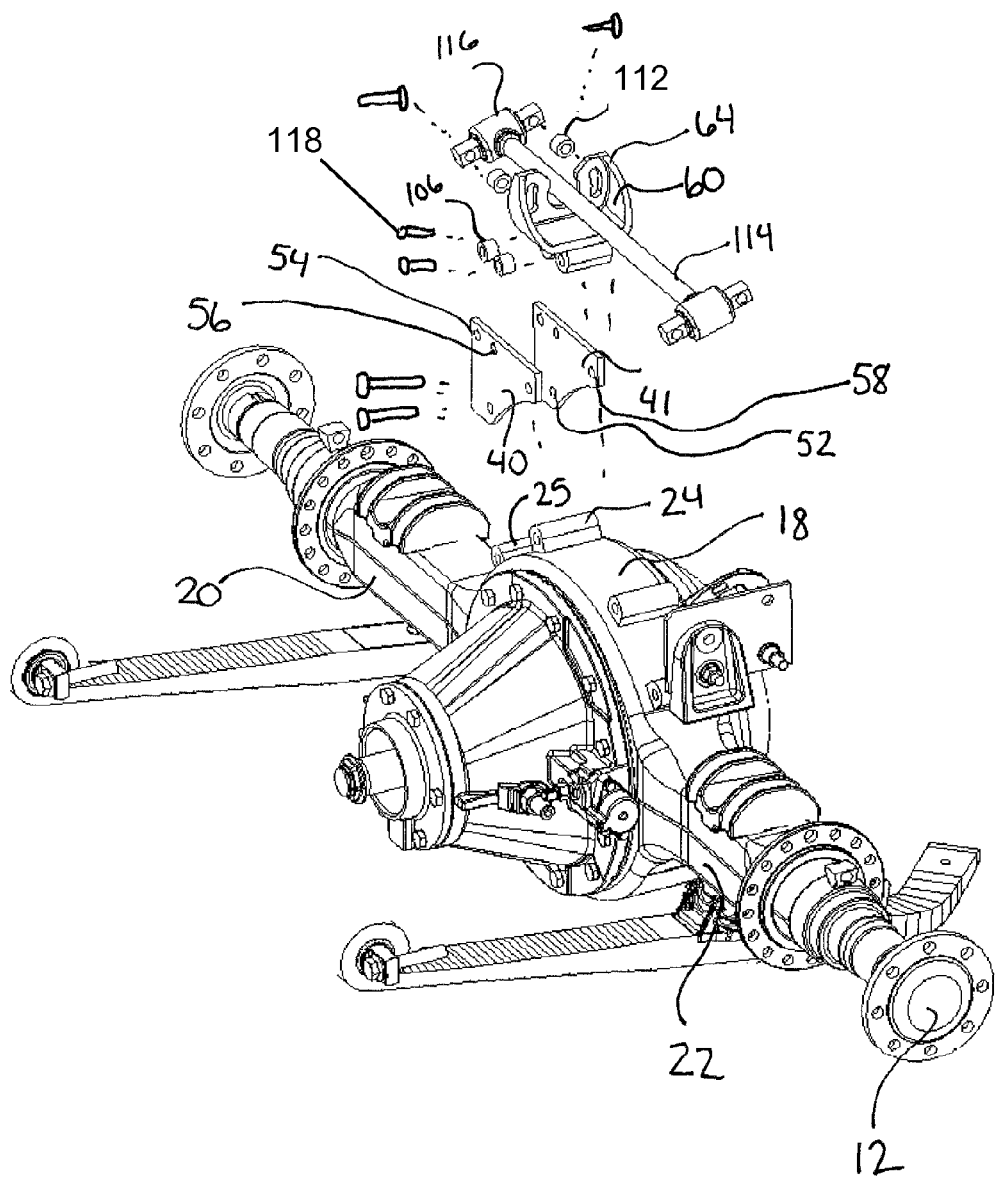
FIG. 1 is an exploded view of an axle assembly for a motor vehicle.
Figure 2:
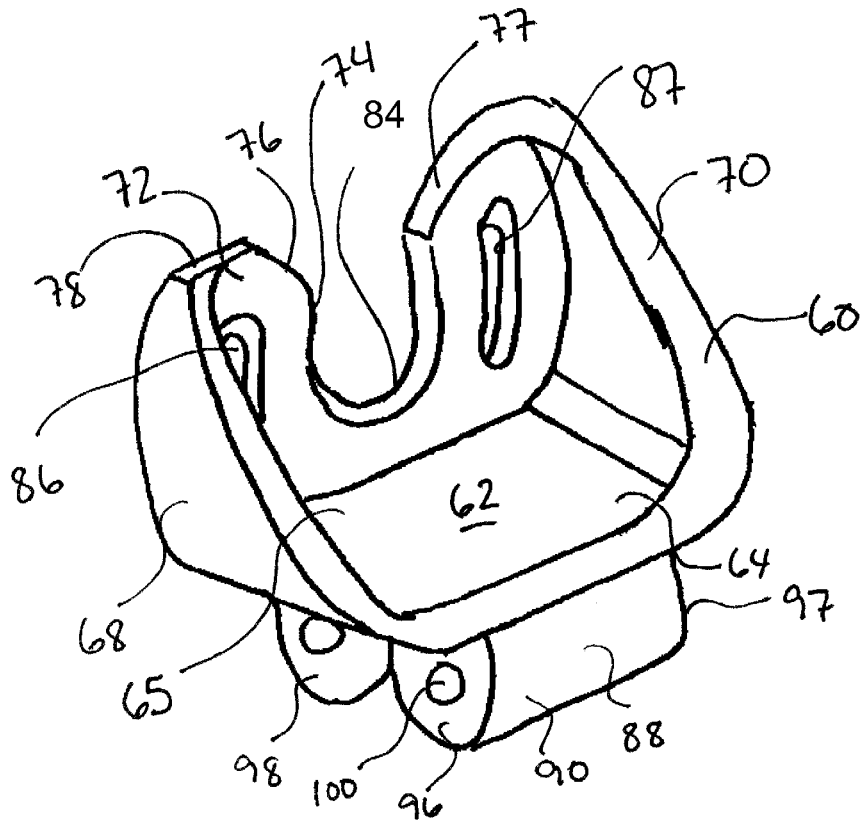
FIG. 2 is a perspective view of a torque rod mounting bracket.
Figure 3:
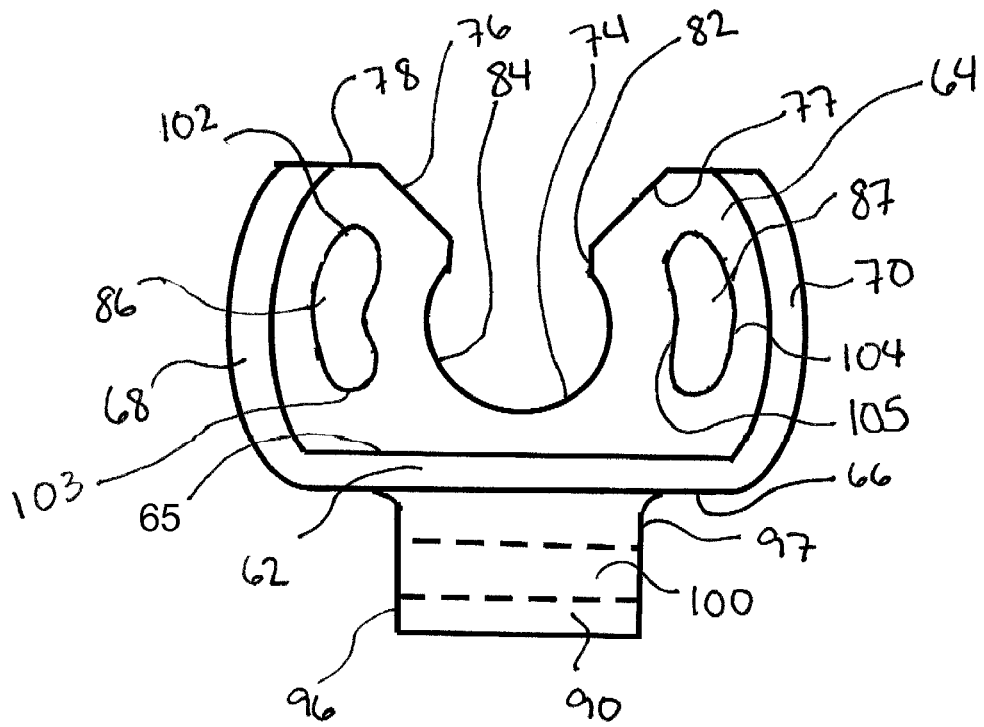
FIG. 3 is a front view of a torque rod mounting bracket with a bore in phantom.
Figure 4:
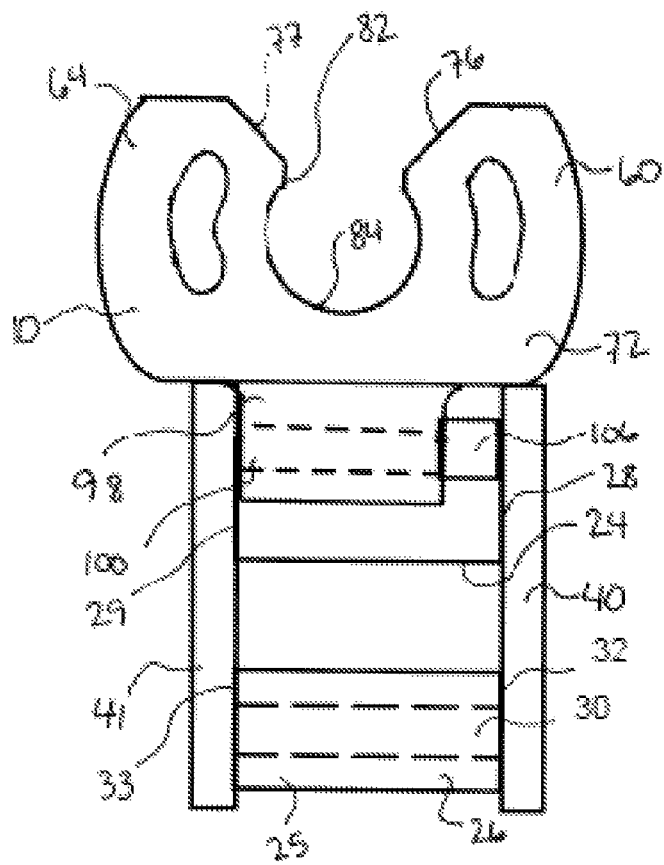
FIG. 4 is a rear view of a torque rod mounting assembly with an opening and a bore in phantom.
Figure 5:
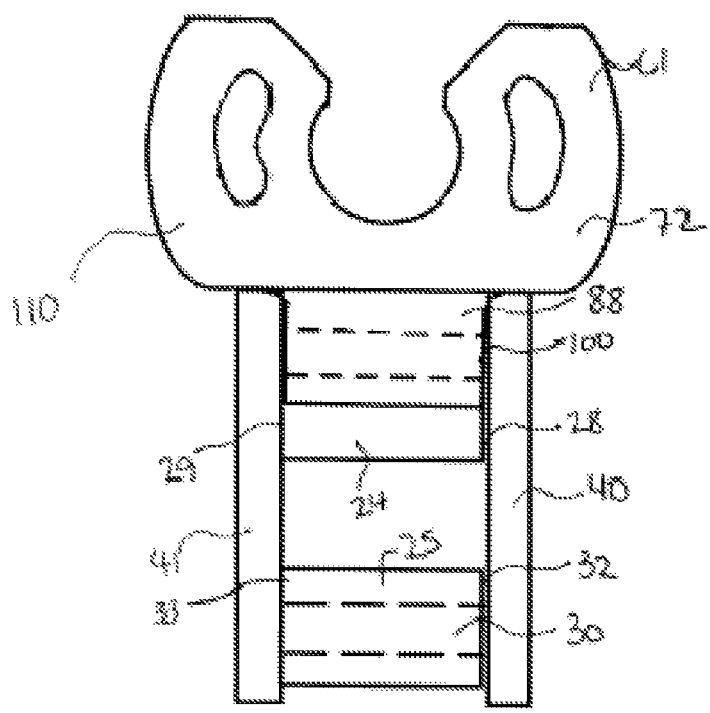
FIG. 5 is a rear view of a torque rod mounting assembly with an opening and a bore in phantom.
Figure 6:
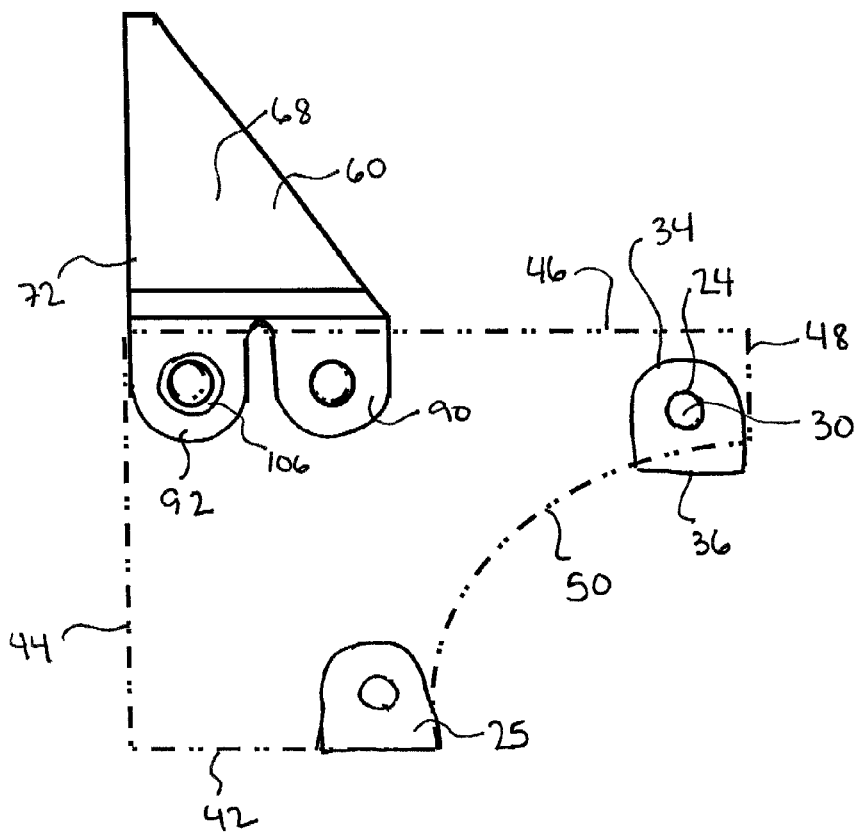
FIG. 6 is a front view of a torque rod mounting assembly with a plate in phantom.

Turning to the Figures where like reference numerals refer to like structures, a torque rod bracket assembly 10 connects to an axle assembly 12 of a motor vehicle 14. The axle assembly 12 has an axle housing 16 with a central portion 18. A first arm 20 and a second arm 22 opposite the first arm 20 project from the central portion 18.

The torque rod bracket assembly 10, 110 has plates 40, 41 which engage a torque bar mounting bracket 60, 61. The 40, 41 mount to the axle housing 16 with axle mounts 24, 25 projecting from the axle housing 16. The first plate 40 and the second plate 41 can be parallel.

Each of the plates 40, 41 are polygons. The first side 42 is linear. A second side 44 is substantially perpendicular to the first side 42 and is linear. A third side 46 is substantially perpendicular to the second side 44 and is linear. A fourth side 48 is substantially perpendicular to the third side 46 and is linear. A fifth side 50 can be nonlinear and extends between the first side 42 and the fourth side 48. The fifth side 50 can be shaped to align with the axle housing 16.

Each of the plates 40, 41 have apertures which align with the bores 100 of the plate connectors 88 and the openings 30 of the axle mounts 24, 25. A first aperture 52 is located at the first side 42, such as near the fifth side 50. A second aperture 54 is located along the third side 46, such as near the second side 44. A third aperture 56 is spaced apart from the second aperture 54 and is located along the third side 46. A fourth aperture 58 is located at the fifth side 50 at or near the fourth side 48. Additional apertures in the plates can be used to adjust the location of the torque bar mounting bracket for the length of the torque bar.

Axle mounts 24, 25 fasten to the plates 40, 41. Each of the axle mounts 24, 25 has a body 26, opposite fore and aft ends 28, 29 and an opening 30 in the body 26 from the fore end 28 to the aft end 29. The body 26 of each axle mount 24, 25 has a curved top 34 and linear bottom 36. The axle mounts 24, 25 project from the axle housing 16, such as the central portion 18. The axle mounts can attach to the axle housing, such as by welding, or can be unitary with the axle housing.

First axle mount 24 is located on the central portion 18 of the axle housing 16 and has a first fore end 28 and an opposite first aft end 28. A second axle mount 25 is spaced apart from the first axle mount 24 and is located between the axle mount 24 and the first axle housing arm 20. The second axle mount 25 has a second fore end 32 and a second aft end 33.

The torque rod mounting bracket 60 fastens to the plates 40, 41. The torque rod mounting bracket 60 has a retainer 64 and a plate connector 88. The retainer 64 has a base 62 with a first face 65 and an opposite second face 66. A first sidewall 68 extends outwardly from the base 62. A second sidewall 70 extends outwardly from the base 62 opposite the first sidewall 68.

A receiver wall 72 is located between the first sidewall 68 and the second sidewall 70 and is substantially perpendicular to the base 62. The receiver wall 72 has a recess 74 being centrally located between the first sidewall 68 and the second sidewall 70. The recess 74 can have inclines 76, 77 located on opposite sides of the recess 74 and are slanted. Inclines 76, 77 can lead from the top 78 of the recess 74 to a throat 82 or generally vertical section before reaching the torque rod receiver 84.

First and second slots 86, 87 are located in the receiver wall 72 between the recess 74 and one of the sidewalls. The first slot 86 is located between the receiver wall 72 and the first sidewall 68. The second slot 87 is located between the receiver wall 72 and the second sidewall 70. Each of the first and second slots 86, 87 are aligned in a generally vertical direction with a top 102 above the throat 82 and the bottom 103 at or below the lowest part of the torque rod receiver 84. The slots 86, 87 can be curved with the back 104 less curved than the front 105.

The slots can be used to adjust the height and angle of the torque rod within the torque rod mounting bracket. Fasteners can be inserted through the slots to fasten the torque rod to the torque rod mounting bracket at the height and angle for the motor vehicle. Bolts can be used at the end of the fasteners to secure the fastener in place in the slot.

A plate connector 88 projects outwardly from the second face 66 of the base 62. The plate connector 88 can include one or more plate mount 90, 91. The plate mount 90, 91 has a connector body 92, opposite fore and aft connector ends 96, 97 and a bore 100 in the connector body 92 from the fore connector end 96 to the aft connector end 97. The bore 100 aligns with one of the apertures in one of the plates. The connector body 92 can have a curved top and linear bottom. A first plate mount 90 has first fore and aft connector ends 96, 97. A second plate mount 91 adjacent to the first plate mount 90 has second fore and aft connector ends 96, 97.

Spacers 106 can be used between the torque rod mounting bracket 60 and one of the plates 40, 41. Spacers 106 are used when the plate connector 88 of the torque rod mounting bracket 60 is narrower than the length of the axle mounts 24, 25. The spacers 106 have a spacer opening 108 that can receive a fastener. While the spacers can be cylindrical, they can also be plates, shims, blocks, and the like with a spacer opening.

Torque rod spacers 112 can fit between the torque rod mounting bracket 60 and the head 116 of the torque rod 114. A fastener can be inserted through the slot 87, the torque rod spacer 112 and the head 116 of the torque rod 114 to fasten the torque rod 114 to the torque rod bracket assembly 10. While the torque rod spacers can be cylindrical, they can also be plates, shims, blocks, and the like with a spacer opening.

In use, the first aperture 52 of the plates 40, 41 is aligned with the opening 30 of the axle mount 25. The fourth aperture 58 aligns with the opening 30 of the axle mount 24. Fasteners 118 can be used to fasten the plates and the plate mounts. The second aperture 54 and the third aperture 56 of each of the plates 40, 41 are aligned with the bores 100 of the plate connector 88 of the torque rod bracket 60. If a spacer is used, the spacer opening 108 is aligned with the bore of the plate connector and the aperture of the plate. Fasteners can be used to fasten the plates and the plate mounts.

Figure 9:
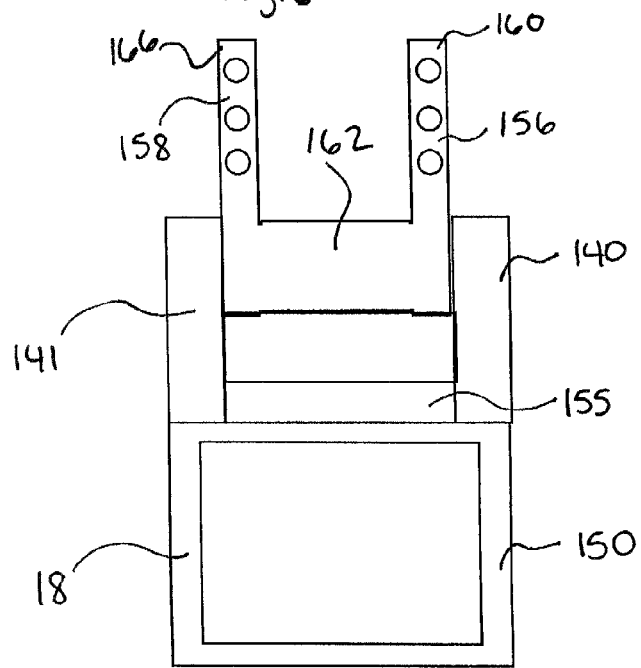
FIG. 9 is a view of section A-A of a torque rod mounting assembly mounted to an axle housing of FIG. 8.
Figure 7:
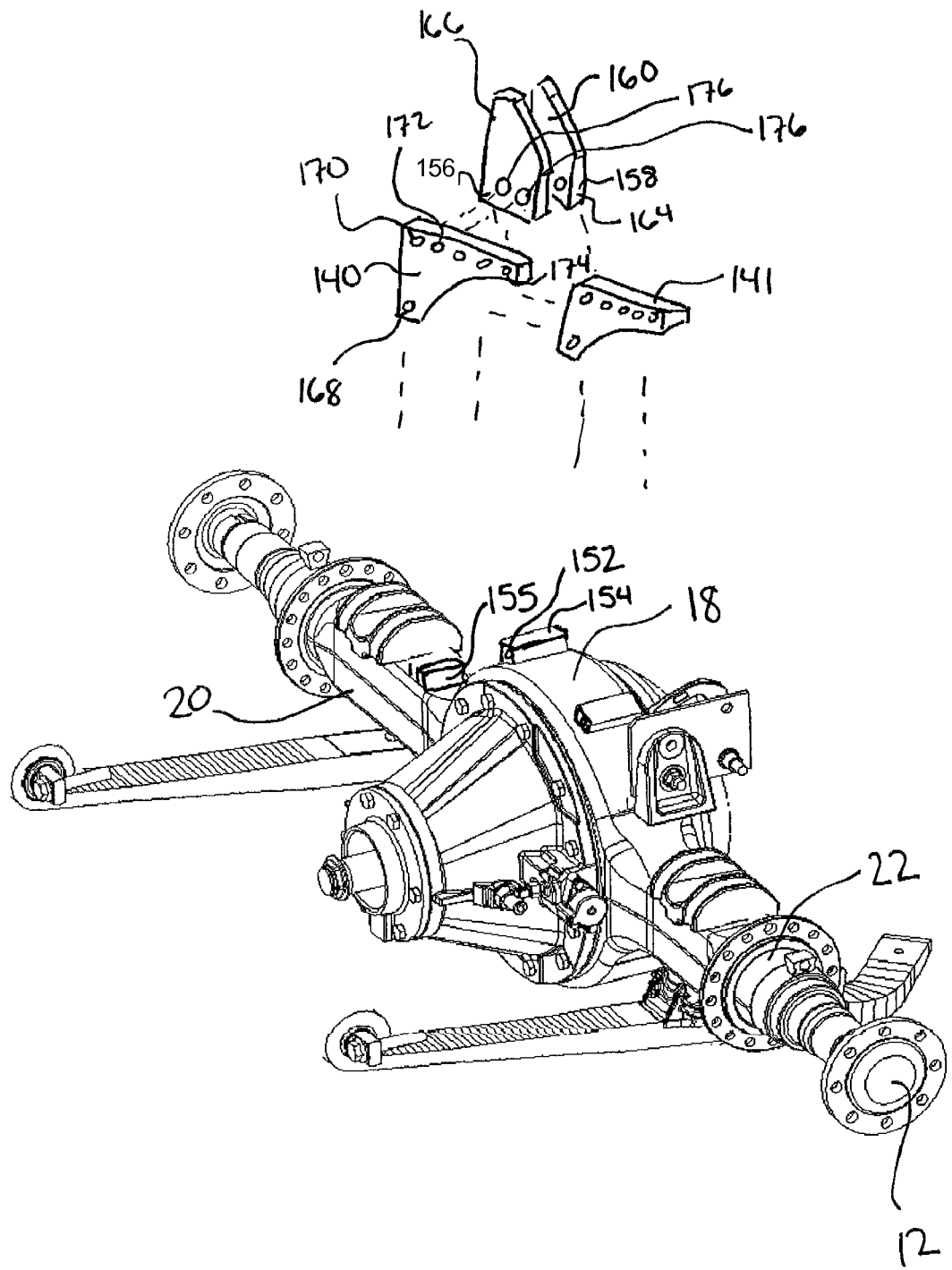
FIG. 7 is a exploded view of an axle assembly.
Figure 8:
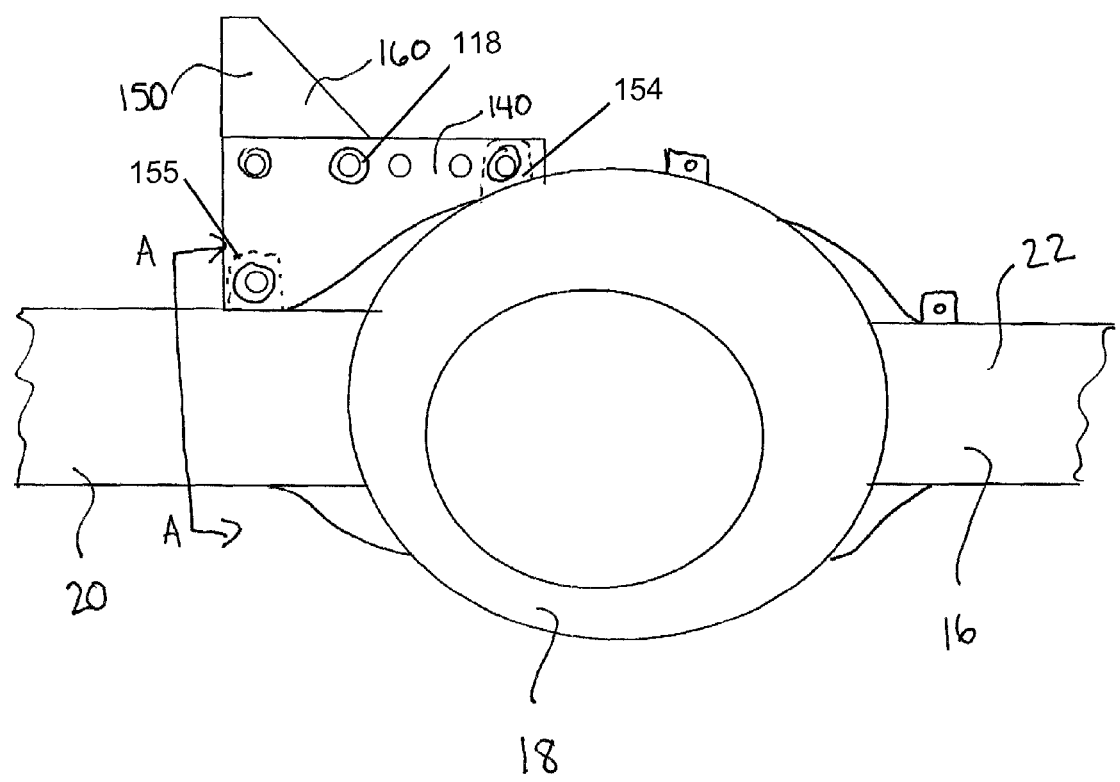
FIG. 8 is a front plan partial view of an axle assembly with a torque rod bracket assembly and the axle mounts in phantom.

The torque rod bracket assembly 150 of FIGS. 7-9 has first and second plates 140, 141 which engage a torque bar mounting bracket 160 or spacers. The first and second plates 140, 141 mount to the axle assembly housing 18 with axle mounts 154, 155. Axle mounts 154, 155 are rectangular in shape. First axle mount 154 projects from central portion 18 of axle housing 16. Second axle mount 155 is spaced apart from first axle mount 154 and projects from the first arm 20 of axle housing 16.

The torque rod bracket 160 has a receiver 166 and plate connector 164. The receiver 166 has opposite first and second sidewalls 156, 158 with a base 162 therebetween. The plate connector 164 is the lower portion of the first and second sidewalls 156, 158 that is fastened to the plates 140, 141.

In use, a first aperture 168 of the plates 140, 141 is aligned with the opening 152 of the axle mount 155. The fourth aperture 174 aligns with the opening 152 of the axle mount 154. Fasteners 118 can be used to fasten the plates and the plate mounts. The second aperture 170 and the third aperture 172 of each of the plates 140, 141 are aligned with the bores 176 of the plate connector 164 of the torque rod bracket 160. If a spacer is used, the spacer opening 108 is aligned with the bore 176 and the aperture of the plate. Fasteners can be used to fasten the plates and the plate connector. Additional apertures in the plates can be used to adjust the location of the torque bar mounting bracket for the length of the torque bar.

What is claimed is:

1. A torque rod bracket assembly, comprising:
   two plates;
   a torque rod mounting bracket having a retainer, and a plate connector engaging at least one of the two plates;
   the retainer having a base having a first face, and an opposite second face;
   a first sidewall extending outwardly from the base;
   a second sidewall extending outwardly from the base opposite the first sidewall;
   a receiver wall located between the first sidewall and the second sidewall and being substantially perpendicular to the base;
   a recess being centrally located between the first sidewall and the second sidewall in the receiver wall; and
   axle mounts fastening to the two plates and having a body, opposite fore and aft ends, and an opening in the body from the fore end to the aft end.

2. The torque rod bracket assembly of claim 1, wherein the receiver wall further comprises:
   a first slot located between the recess and the first sidewall;
   a second slot located between the recess and the second sidewall.

3. The torque rod bracket assembly of claim 2, wherein the recess further comprises:
   a torque rod receiver;
   inclines located on opposite sides of the recess, wherein the inclines are slanted; and
   a throat located between the torque rod receiver and the inclines.

4. The torque rod bracket assembly of claim 3, wherein the plate connector further comprises:
   at least one plate mount having a connector body, a fore connector end, an aft connector end opposite the fore connector end, and a bore in the connector body from the fore connector end to the aft connector end; and
   wherein the two plates engage the plate connector by being fastened to the bore.

5. The torque rod bracket assembly of claim 4, wherein each of the two plates further comprises:
   a first side;
   a second side substantially perpendicular to the first side;
   a third side substantially perpendicular to the second side;
   a fourth side substantially perpendicular to the third side;

a fifth side extending between the first side and the fourth side;
a first aperture located at the first side;
a second aperture located at the third side near the second side and aligning with the bore in the plate mount;
a third aperture spaced apart from the second aperture and located along the third side; and
a fourth aperture located at the fifth side and aligning with the opening in the axle mount.

6. The torque rod bracket assembly of claim 1, further comprising:
a spacer located between one of the plates and the plate connector.

7. The torque rod bracket assembly of claim 6, wherein the recess further comprises:
a torque rod receiver;
inclines located on opposite sides of the recess and being slanted; and
a throat located between the torque rod receiver and the inclines.

8. The torque rod bracket assembly of claim 7, wherein each of the two plates further comprises:
a first side;
a second side substantially perpendicular to the first side;
a third side substantially perpendicular to the second side;
a fourth side substantially perpendicular to the third side;
a fifth side extending between the first side and the fourth side;
a first aperture located at the first side;
a second aperture located at the third side near the second side and aligning with the bore in the plate mount;
a third aperture spaced apart from the second aperture and located along the third side; and
a fourth aperture located at the fifth side and aligning with the opening in the axle mount.

9. A torque rod mounting bracket, comprising:
a base having a first face, and an opposite second face;
a first sidewall extending outwardly from the base;
a second sidewall extending outwardly from the base opposite the first sidewall;
a receiver wall located between the first sidewall and the second sidewall and being substantially perpendicular to the base;
a recess centrally located between the first sidewall and the second sidewall in the receiver wall;
a first slot located between the recess and the first sidewall;
a second slot located between the recess and the second sidewall; and
a plate connector projecting from the second face of the base.

10. The torque rod mounting bracket of claim 9, wherein the plate connector further comprises:
at least one plate mount having a connector body, a fore connector end, an aft connector end opposite the fore connector end, and a bore in the connector body from the fore connector end to the aft connector end.

11. The torque rod mounting bracket of claim 10, wherein the recess further comprises:
a torque rod receiver;
inclines located on opposite sides of the recess, wherein the inclines are slanted; and
a throat being located between the torque rod receiver and the inclines.

12. A torque rod bracket assembly for an axle assembly, comprising:

an axle housing having a central portion, a first arm projecting from the central portion, and a second arm opposite the first arm and projecting from the central portion;
a first axle mount projecting from the central portion of the axle housing, the first axle mount having a first fore end, and an opposite first aft end;
a second axle mount projecting from the axle housing and being spaced apart from the first axle mount, the second axle mount having a second fore end, and an opposite second aft end;
a first plate engaging the first fore end and the second fore end;
a second plate engaging the first aft end and the second aft end; and
a torque rod mounting bracket having a retainer, and a plate connector engaging the second plate.

13. The torque rod bracket assembly for an axle assembly of claim 12, further comprising;
a spacer located between the first plate and the plate connector.

14. The torque rod bracket assembly for an axle assembly of claim 12, wherein the retainer further comprises:
a first sidewall extending outwardly from the base;
a second sidewall extending outwardly from the base opposite the first sidewall;
a receiver wall located between the first sidewall and the second sidewall and being substantially perpendicular to the base; and
a recess being centrally located between the first sidewall and the second sidewall in the receiver wall.

15. The torque rod bracket assembly for an axle assembly of claim 13, further comprising:
a first slot located between the recess and the first sidewall; and
a second slot located between the recess and the second sidewall.

16. The torque rod bracket assembly for an axle assembly of claim 15, wherein the recess further comprises:
a torque rod receiver;
inclines located on opposite sides of the recess, wherein the inclines are slanted; and
a throat being located between the torque rod receiver and the inclines.

17. The torque rod bracket assembly for an axle assembly of claim 16, wherein the plate connector further comprises:
at least one plate mount having a connector body, a fore connector end, an aft connector end opposite the fore connector end, and a bore in the connector body from the fore connector end to the aft connector end.

18. The torque rod bracket assembly for an axle assembly of claim 17, wherein each of the first plate and the second plate further comprises:
a first side;
a second side substantially perpendicular to the first side;
a third side substantially perpendicular to the second side;
a fourth side substantially perpendicular to the third side;
a fifth side extending between the first side and the fourth side;
a first aperture located at the first side;
a second aperture located at the third side near the second side;
a third aperture spaced apart from the second aperture and located along the third side; and
a fourth aperture located at the fifth side.

* * * * *